(12) United States Patent
Schrock et al.

(10) Patent No.: US 9,678,618 B1
(45) Date of Patent: Jun. 13, 2017

(54) USING AN EXPANDED VIEW TO DISPLAY LINKS RELATED TO A TOPIC

(75) Inventors: Jasson Arthur Schrock, Mountain View, CA (US); Chase Hensel, San Francisco, CA (US); Andre Rohe, Mountain View, CA (US); Srividya Sriram, San Francisco, CA (US); Vikas Sukla, Sunnyvale, CA (US); Allan Banaag, San Jose, CA (US); Krishna Bharat, San Jose, CA (US); Andrey Prigogin, Belmont, CA (US); Sam Felder, New York, NY (US)

(73) Assignee: Google Inc., Mountain View, CA (US)

( * ) Notice: Subject to any disclaimer, the term of this patent is extended or adjusted under 35 U.S.C. 154(b) by 270 days.

(21) Appl. No.: 13/485,565

(22) Filed: May 31, 2012
(Under 37 CFR 1.47)

Related U.S. Application Data

(60) Provisional application No. 61/491,822, filed on May 31, 2011.

(51) Int. Cl.
*G06F 3/0481* (2013.01)
(52) U.S. Cl.
CPC .................................. *G06F 3/0481* (2013.01)
(58) Field of Classification Search
USPC ........................................................ 715/201
See application file for complete search history.

(56) References Cited

U.S. PATENT DOCUMENTS

| 8,788,502 | B1 * | 7/2014 | Hensel et al. | 707/738 |
|---|---|---|---|---|
| 2005/0246352 | A1 * | 11/2005 | Moore et al. | 707/100 |
| 2006/0031214 | A1 * | 2/2006 | Solaro | G06F 17/30864 |
| 2006/0265417 | A1 * | 11/2006 | Amato | G06F 17/30864 |
| 2008/0104542 | A1 * | 5/2008 | Cohen | G06F 17/30864 715/810 |
| 2008/0141132 | A1 * | 6/2008 | Tsai | 715/716 |
| 2009/0070346 | A1 * | 3/2009 | Savona | G06F 17/30705 |
| 2009/0187540 | A1 * | 7/2009 | Richardson et al. | 707/3 |
| 2009/0259927 | A1 * | 10/2009 | Fisher | G06F 17/30864 715/205 |
| 2009/0307188 | A1 * | 12/2009 | Oldham | G06F 3/0482 |

(Continued)

FOREIGN PATENT DOCUMENTS

EP         1729225 A2 * 12/2006

OTHER PUBLICATIONS

Heidi Lam and Patrick Baudisch, Summary Thumbnails, Apr. 2005, PAPERS: Small Devices 2, 691-688.*

(Continued)

*Primary Examiner* — Kavita Padmanabhan
*Assistant Examiner* — Ahmad M El-Bkaily
(74) *Attorney, Agent, or Firm* — Patent Law Works LLP

(57) ABSTRACT

Documents relating to a topic may be presented to users using visually expandable views. In one implementation, a web page may include a number of topics each presented in a visual area that is presented to a user as one of two views, the two views including, for each of the particular topics: a first view in which a link to a document relating to the topic is presented to a user, and a second view, expanded visually relative to the first view, in which links, to a number of different types of documents and associated with a number of different domains, relating to the particular topic, are presented to the user.

17 Claims, 9 Drawing Sheets

(56) References Cited

U.S. PATENT DOCUMENTS

| | | | |
|---|---|---|---|
| 2012/0054166 A1* | 3/2012 | Jeremias | G06F 17/30265 |
| | | | 707/706 |
| 2012/0139940 A1* | 6/2012 | Chavanne | G06F 17/30861 |
| | | | 345/629 |
| 2012/0191715 A1* | 7/2012 | Ruffner | G06F 17/30011 |
| | | | 707/738 |

OTHER PUBLICATIONS

Google Mobile Blog, "Enhancements to Google News for smartphones," Nov. 8, 2010, http://googlemobile.blogspot.com/2010/11/enhancements-to-google-news-for.html, 3 pages.

* cited by examiner

US 9,678,618 B1

USING AN EXPANDED VIEW TO DISPLAY LINKS RELATED TO A TOPIC

RELATED APPLICATION

The present application claims the benefit of U.S. Provisional Patent Application No. 61/491,822, titled "DISPLAY OF TOPICS USING AN EXPANDED VIEW," which was filed on May 31, 2011, and which is hereby incorporated by reference as though fully set forth herein.

BACKGROUND

Many web pages (e.g., web search result pages) display summary lists of information containing short descriptions and links to underlying information. For example, the home page of a news search site may display a summary list of the most recent or most popular news stories. The documents corresponding to a particular news story may be drawn from a number of underlying sources, such as online newspapers or other content providers.

When deciding what to display in a summary list, such as a summary list of the current news stories, there is a tension between the amount of space to use to display each story's summary and the extent of the summary. Larger summaries may be more useful to users but require more display space and, thus, fewer stories can be shown.

SUMMARY

According to one aspect, a method may include determining clusters of related documents, where the documents, in each of the clusters, are related to a topic from a list of topics. The method may further include providing a web page that includes information regarding a list of topics, where the web page includes instructions to selectively display information regarding a particular topic, in the list of topics, as one of two views. A first view may be presented to a user that includes a link to a document relating to the particular topic. The second view may be expanded visually relative to the first view and may present links to a number of types of documents (associated with different domains, relating to the particular topic), to the user, where the link to the document relating to the particular topic and the links to the different types of documents are selected from one of the clusters. The method may further include providing at least one visual element in the web page that, when selected by the user for the particular topic, causes the view corresponding to the particular topic to change from the first view to the second view or from the second view to the first view. The method may further include transmitting the web page to a client device associated with the user. Other aspects include corresponding systems, apparatus, and computer program products.

These and other aspects can include one or more of the following features. The links may include links that are visually presented as anchor text, links that are visually presented as images that are visually distinguished as initiating video, and links that are visually presented as images that reference hyper-text markup language (HTML) text documents. The links may include a label that identifies a type of the document corresponding to one of the plurality of links. The labels may include one or more of: a label that identifies a document as highly cited by other documents, a label that identifies a document as a local document, a label that identifies a document as being an opinion document, or a label that identifies a document as being from an online encyclopedia or wiki. The list of topics may include topics relating to news stories and the server device may implement a news search engine. At least one of the links in the second view may be a link to a video, and the at least one link, when selected by the user, may cause the video to play in an active window that is overlaid on the second view. Further, when selecting the at least one additional link to provide context to the particular topic, the at least one additional link may be provided in the second view and may correspond to a document that is outside of the one of the clusters.

According to another aspect, a method may include receiving information describing a topic; determining, based on the information, a cluster of sources relating to the topic; generating a web page to present the topic to a user as one of two views, the web page including: instructions to present a first view of the two views as a link to a document relating to the topic, and instructions to present a second view, expanded visually relative to the first view, in which links to a number of different types of documents relating to the topic are presented to the user. The web page may further include instructions to provide a selectable visual element in the first view and the second view. The selectable visual element, when selected by the user, may cause the view corresponding to the particular topic to change from the first view to the second view or from the second view to the first view. Other aspects include corresponding systems, apparatus, and computer program products.

These and other aspects can include one or more of the following features. The method may further include performing the receiving, determining, and generating for a number of topics; and generating the web page to present the list of topics to the user. The information describing the topic may include a document or a search query. The links may include links that are visually presented as anchor text, links that are visually presented as images that are visually distinguished as initiating video, and links that are visually presented as images that reference hyper-text markup language (HTML) text documents. The links, which are visually presented as anchor text, may include a label that identifies a type of the document corresponding to one of the links. The labels may include one or more of: a label that identifies a document as highly cited relative to other documents, a label that identifies a document as a local document, a label that identifies a document as being an opinion document, or a label that identifies a document as being from an online encyclopedia or wiki. The links may be determined to provide context to the topic.

BRIEF DESCRIPTION OF THE DRAWINGS

The accompanying drawings, which are incorporated in and constitute a part of this specification, illustrate one or more implementations described herein and, together with the description, explain these implementations.

DETAILED DESCRIPTION

Figure 1A:
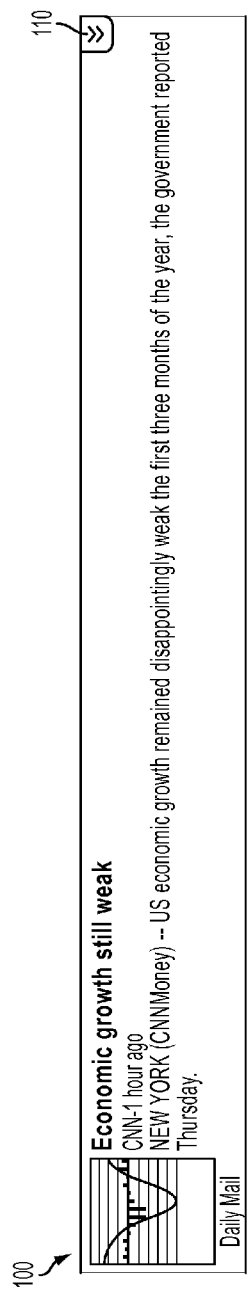
FIGS. 1A and 1B are diagrams illustrating an example of concepts described herein.

The following detailed description refers to the accompanying drawings. The same reference numbers in different drawings may identify the same or similar elements.

A "document," as the term is used herein, is to be broadly interpreted to include any machine-readable and machine-storable product. A document may include, for example, an e-mail, a website, a business listing, a file, a combination of files, one or more files with embedded links to other files, a news group posting, a blog, a web advertisement, a digital map, a video, audio, etc. In the context of the Internet, a common document is a web page. Documents often include textual information and may include embedded information (such as meta information, images, hyperlinks, etc.) and/or embedded instructions (such as Javascript, etc.). A "link," as the term is used herein, is to be broadly interpreted to include any reference to/from a document from/to another document or another part of the same document. A link may be associated with "anchor text," which may refer to the text or other information (e.g., an image) that is presented to a user to describe or represent the content of the linked document. Frequently, anchor text is visually distinguished, such as by using a different font color, from surrounding text, to inform the reader that the anchor text may be selected when the reader wishes to access the underlying document.

An aggregation site, such as a news site or a news search site, may aggregate documents published by content producers. For example, the home page for a news search site may present the reader with a list of the most popular and/or current news stories. Each news story may be described by a number of documents relating to the news story. For example, a news story about a recent tornado may include numerous web documents, published by a number of online newspapers, describing the damage done by the tornado. Videos of the tornado and videos of on-scene reporters may also be relevant to the news story. Other documents, such as documents generally describing how tornadoes occur, weather reports, or images of the tornado damage may also be relevant to a user interested in the news story. These documents may be gathered by the aggregation site as a cluster of documents relating to the topic of this news story.

Consistent with aspects described herein, clusters of documents may be presented to users using a visually expandable view. The visually expandable view may include a "summary" view in which a short description of the topic corresponding to the cluster may be shown to the user. For example, the summary view may be based on one or two documents from the cluster, and may include anchor text that briefly describes the document, a snippet of text from the document, and an image relating to the topic.

The user may be able to enlarge the summary view to obtain an "expanded" view. The expanded view may include additional information relating to the topic. For example, the expanded view may include links to multiple text documents about the topic, links to videos about the topic, links to search queries that are related to the document, or other related information/facts. In one particular implementation, the other related information/facts may include documents that are selected to provide context or background information relating to the topic. For example, if the topic is about a recent tornado event, a link may be provided to an online user-created encyclopedia (a wiki) that generally discusses tornadoes. As another example, if the topic is about a trial of a celebrity, a link may be provided to a document that gives a biography of the celebrity.

Figure 1B:
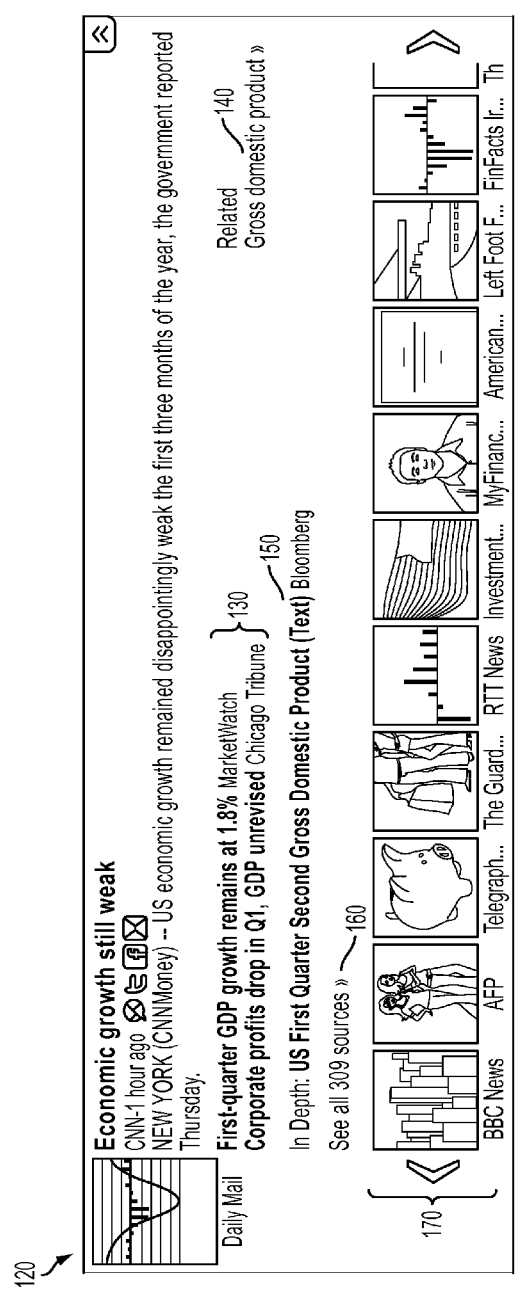

FIGS. 1A and 1B are diagrams illustrating examples of a summary view and an expanded view for an example topic. In this example, the topic relates to a finance story describing that U.S. economic growth is weak. The finance story may be based on the recent release of weak economic growth numbers. As shown in FIG. 1A, summary view 100 may include a title describing the story ("Economic growth is weak"). The title may include anchor text that, when selected by the user, may lead to an article about U.S. economic growth. Summary view 100 may also include an image relating to the topic (e.g., a thumbnail of a chart). The image may also be a link that, when selected, may take the user to the article from which the image was selected. By selecting icon 110, the user may be able to expand the view to the view shown in FIG. 1B.

As shown in FIG. 1B, expanded view 120, in addition to presenting the information in summary view 100, may present additional information relating to the topic, such as: links, shown via anchor text 130, to additional articles; a related search query 140; a link 150 that includes a label "In Depth," which may indicate that the article referred to by the link is a longer (more in-depth) article about the topic; a link 160 to display the full list of sources/documents in the cluster; and a number of other links 170, which may be presented as images drawn from the documents corresponding to links 170. Related search query 140, when selected by the user, may cause a search query to be submitted for the indicated search query. In this example, the query "gross domestic product" may be submitted, which may return documents describing what is meant by the term "gross domestic product."

Expanded view 120 may advantageously provide an interested user with additional information relating to a topic. The additional information may include more than just alternate sources for articles about the topic. For example, and as illustrated, the additional information may include context or background information relating to the topic, facts relating to the topic, search queries, and/or images.

Figure 2:
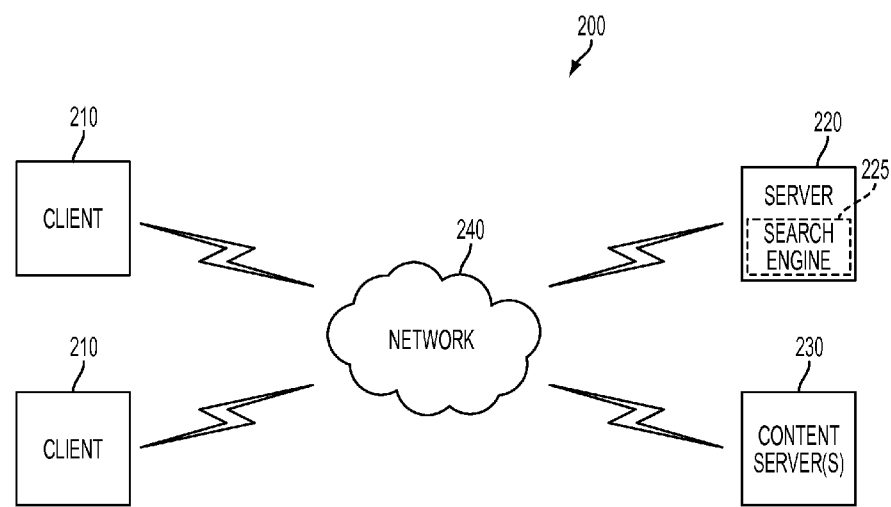
FIG. 2 is a diagram of an example environment in which techniques described herein may be implemented.

FIG. 2 is a diagram of an example environment 200 in which techniques described herein may be implemented. Environment 200 may include multiple clients 210 connected to one or more servers 220-230 via a network 240. Two clients 210 and two servers 220-230 have been illustrated as connected to network 240 for simplicity. In practice, there may be additional or fewer clients and servers. Also, in some instances, a client may perform one or more functions of a server and a server may perform one or more functions of a client.

Clients 210 may include devices of users that access servers 220-230. A client 210 may include, for instance, a personal computer, a wireless telephone, a personal digital assistant (PDA), a laptop, a smart phone, a tablet computer, or another type of computation or communication device. Servers 220 and 230 may include devices that access, fetch, aggregate, process, search, and/or maintain documents. Although shown as single components 220 and 230 in FIG. 2, each server 220 and 230 may, in some implementations, be implemented as multiple computing devices, which may potentially be geographically distributed. Clients 210 and servers 220 and 230 may connect to network 240 via wired, wireless, or a combination of wired and wireless connections.

Server 220 may include a search engine 225 usable by users of clients 210. Server 220 may implement a data aggregation service by crawling a corpus of documents (e.g., web pages) hosted on content server(s) 230, indexing the documents, and storing information associated with these documents in a repository of crawled documents. The aggregation service may be implemented in other ways, such as by agreement with the operator(s) of content server(s) 230 to distribute their documents via the data aggregation service. Search engine 225 may execute a search using a query, received from a user at a client 210, on the corpus of documents stored in the repository of crawled documents. In one implementation, search engine 225 may be a specialized search engine, such as a news search engine. In this situation, search engine 225 may be used to locate documents about current news topics and may include an initial home page that displays, in addition to a search query entry box, a list of current news stories.

Content server(s) 230 may store or maintain documents that may be crawled by server 220. Such documents may include data related to published news stories, products, images, user groups, geographic areas, or any other type of data. The documents may include text documents, videos, audio documents, and/or images. For example, server(s) 230 may be servers maintained by news providers such as, for example, the Washington Post, the New York Times, Time Magazine, or Newsweek. As another example, server(s) 230 may store or maintain data related to specific products, such as product data provided by one or more product manufacturers. As yet another example, server(s) 230 may store or maintain data related to other types of web documents, such as pages of web sites.

While servers 220-230 are shown as separate entities, it may be possible for one of servers 220-230 to perform one or more of the functions of the other one of servers 220-230. For example, it may be possible that servers 220 and 230 are implemented as a single server. It may also be possible for a single one of servers 220 and 230 to be implemented as two or more separate (and possibly distributed) devices.

Network 240 may include one or more networks of any type, including a local area network (LAN), a wide area network (WAN), a metropolitan area network (MAN), a telephone network, such as the Public Switched Telephone Network (PSTN) or a Public Land Mobile Network (PLMN), an intranet, the Internet, a memory device, or a combination of networks.

Figure 3:
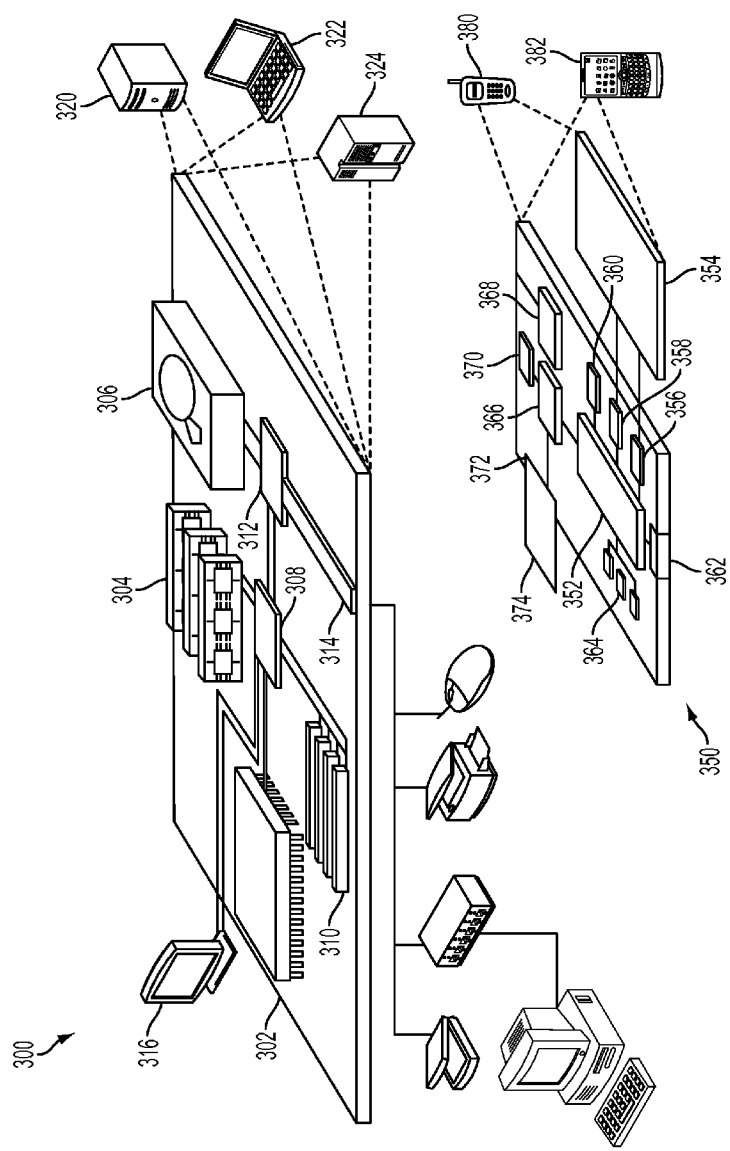
FIG. 3 shows an example of a computing device and a mobile computing device.

FIG. 3 shows an example of a computing device 300 and a mobile computing device 350, which may be used with the techniques described herein. Computing device 300 may correspond to, for example, client 210 and/or server 220/230. For example, each of clients 110 and servers 220/230 may include one or more computing devices 300. Mobile computing device 350 may correspond to, for example, portable implementations of clients 210.

Computing device 300 is intended to represent various forms of digital computers, such as laptops, desktops, workstations, personal digital assistants, servers, blade servers, mainframes, and other appropriate computers. Mobile computing device 350 is intended to represent various forms of mobile devices, such as personal digital assistants, cellular telephones, smart phones, and other similar computing devices. The components shown here, their connections and relationships, and their functions, are meant to be examples only, and are not meant to limit implementations described and/or claimed in this document.

Computing device 300 may include a processor 302, memory 304, a storage device 306, a high-speed interface 308 connecting to memory 304 and high-speed expansion ports 310, and a low speed interface 312 connecting to low speed bus 314 and storage device 306. Each of the components 302, 304, 306, 308, 310, and 312 may be interconnected using various buses, and may be mounted on a common motherboard or in other manners as appropriate. Processor 302 may process instructions for execution within computing device 300, including instructions stored in the memory 304 or on storage device 306, to display graphical information for a graphical user interface (GUI) on an external input/output device, such as display 316, coupled to high speed interface 308. In another implementation, multiple processors and/or multiple buses may be used, as appropriate, along with multiple memories and types of memory. Also, multiple computing devices 300 may be connected, with each device providing portions of the necessary operations (e.g., as a server bank, a group of blade servers, or a multi-processor system, etc.).

Memory 304 may store information within computing device 300. In one implementation, memory 304 may include a volatile memory unit or units. In another implementation, memory 304 may include a non-volatile memory unit or units. Memory 304 may also be another form of computer-readable medium, such as a magnetic or optical disk. A computer-readable medium may be defined as a non-transitory memory device. A memory device may include memory space within a single physical memory device or spread across multiple physical memory devices.

Storage device 306 may provide mass storage for computing device 300. In one implementation, storage device 306 may include a computer-readable medium, such as a floppy disk device, a hard disk device, an optical disk device, or a tape device, a flash memory or other similar solid state memory device, or an array of devices, including devices in a storage area network or other configurations. A computer program product may be tangibly embodied in an information carrier. The computer program product may also contain instructions that, when executed, perform one or more methods, such as those described below. The information carrier may include a computer or machine-readable medium, such as memory 304, storage device 306, or memory included within processor 302.

High speed controller 308 may manage bandwidth-intensive operations for computing device 300, while low speed controller 312 may manage lower bandwidth-intensive operations. Such allocation of functions is an example only. In one implementation, high-speed controller 308 may be coupled to memory 304, display 316 (e.g., through a graphics processor or accelerator), and to high-speed expansion ports 310, which may accept various expansion cards (not shown). In the implementation, low-speed controller 312 may be coupled to storage device 306 and to low-speed expansion port 314. Low-speed expansion port 314, which may include various communication ports (e.g., USB, BLUETOOTH®, Ethernet, wireless Ethernet) may be coupled to one or more input/output devices, such as a keyboard, a pointing device, a scanner, or a networking device, such as a switch or router, e.g., through a network adapter.

Computing device 300 may be implemented in a number of different forms, as shown in FIG. 3. For example, it may be implemented as a standard server 320, or multiple times in a group of such servers. It may also be implemented as part of a rack server system 324. Additionally or alternatively, computing device 300 may be implemented in a personal computer, such as a laptop computer 322. Additionally or alternatively, components from computing device 300 may be combined with other components in a mobile device (not shown), such as mobile computing device 350. Each of such devices may contain one or more of computing device 300, mobile computing device 350, and/or an entire system may be made up of multiple computing devices 300 and/or mobile computing devices 350 communicating with each other.

Mobile computing device 350 may include a processor 352, a memory 364, an input/output (I/O) device such as a display 354, a communication interface 366, and a transceiver 368, among other components. Mobile computing device 350 may also be provided with a storage device, such as a micro-drive or other device (not shown), to provide additional storage. Each of components 350, 352, 364, 354, 366, and 368 may be interconnected using various buses, and several of the components may be mounted on a common motherboard or in other manners as appropriate.

Processor 352 may execute instructions within mobile computing device 350, including instructions stored in memory 364. Processor 352 may be implemented as a set of chips that may include separate and multiple analog and/or digital processors. Processor 352 may provide, for example, for coordination of the other components of mobile computing device 350, such as, for example, control of user interfaces, applications run by mobile computing device 350, and/or wireless communication by mobile computing device 350.

Processor 352 may communicate with a user through control interface 358 and a display interface 356 coupled to a display 354. Display 354 may include, for example, a TFT LCD (Thin-Film-Transistor Liquid Crystal Display), an OLED (Organic Light Emitting Diode) display, and/or other appropriate display technology. Display interface 356 may comprise appropriate circuitry for driving display 354 to present graphical and other information to a user. Control interface 358 may receive commands from a user and convert them for submission to processor 352. In addition, an external interface 362 may be provide in communication with processor 352, so as to enable near area communication of mobile computing device 350 with other devices. External interface 362 may provide, for example, for wired communication in some implementations, or for wireless communication in other implementations, and multiple interfaces may also be used.

Memory 364 may store information within mobile computing device 350. Memory 364 can be implemented as one or more of a computer-readable medium or media, a volatile memory unit or units, or a non-volatile memory unit or units. Expansion memory 374 may also be provided and connected to mobile communication device 350 through expansion interface 372, which may include, for example, a SIMM (Single In Line Memory Module) card interface. Such expansion memory 374 may provide extra storage space for mobile computing device 350, or may also store applications or other information for mobile computing device 350. Specifically, expansion memory 374 may include instructions to carry out or supplement the processes described above, and may also include secure information. Thus, for example, expansion memory 374 may be provided as a security module for mobile computing device 350, and may be programmed with instructions that permit secure use of mobile computing device 350. In addition, secure applications may be provided via SIMM cards, along with additional information, such as placing identifying information on a SIMM card in a non-hackable manner.

Memory 364 and/or expansion memory 374 may include, for example, flash memory and/or NVRAM memory, as discussed below. In one implementation, a computer program product may be tangibly embodied in an information carrier. The computer program product may store instructions that, when executed, perform one or more methods, such as those described above. The information carrier may correspond to a computer- or machine-readable medium, such as the memory 364, expansion memory 374, or memory included within processor 352, that may be received, for example, over transceiver 368 or over external interface 362.

Mobile computing device 350 may communicate wirelessly through a communication interface 366, which may include digital signal processing circuitry where necessary. Communication interface 366 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 368. In addition, short-range communication may occur, such as using a BLUETOOTH, WiFi, or other such transceiver (not shown). In addition, a Global Positioning System (GPS) receiver module 370 may provide additional navigation- and location-related wireless data to mobile computing device 350, which may be used as appropriate by applications running on mobile computing device 350.

Mobile computing device 350 may also communicate audibly using an audio codec 360, which may receive spoken information from a user and convert it to usable digital information. Audio codec 360 may likewise generate audible sound for a user, such as through a speaker, e.g., in a handset of mobile computing device 350. Such sound may include sound from voice telephone calls, may include recorded sound (e.g., voice messages, music files, etc.) and may also include sound generated by applications operating on mobile computing device 350.

Mobile computing device 350 may be implemented in a number of different forms, as shown in FIG. 3. For example, it may be implemented as a cellular telephone 380. It may also be implemented as part of a smart phone 382, a personal digital assistant (not shown), and/or other similar mobile device.

Various implementations of the systems and techniques described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications, or code) may include machine instructions for a programmable processor, and may be implemented in a high-level procedural and/or object-oriented programming language, and/or in assembly/machine language. As used herein, the terms "machine-readable medium" and "computer-readable medium" may refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" may refer to any signal used to provide machine instructions and/or data to a programmable processor.

To provide for interaction with a user, the systems and techniques described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices may be used to provide for interaction with a user as well. For example, feedback provided to the user may be any form of sensory feedback (e.g., visual feedback, auditory feedback, or tactile feedback); and input from the user may be received in any form, including acoustic, speech, or tactile input.

The systems and techniques described herein may be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system may be interconnected by any form or medium of digital data communication (e.g., a communication network). Examples of communication networks include a local area network ("LAN"), a wide area network ("WAN"), and the Internet.

Although FIG. 3 shows example components of computing device 300 and mobile computing device 350, computing device 300 or mobile computing device 350 may include fewer components, different components, additional components, or differently arranged components than depicted in FIG. 3. Additionally or alternatively, one or more components of computing device 300 or mobile computing device 350 may perform one or more tasks described as being performed by one or more other components of computing device 300 or mobile computing device 350.

Figure 4:
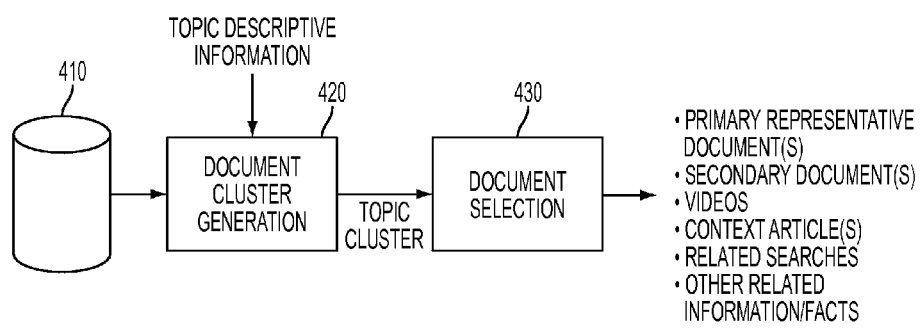
FIG. 4 is a diagram of example functional components of a server.

FIG. 4 is a diagram of example functional components of server 220, relating to the presentation of topics using an expanded view. As shown in FIG. 4, the functional components may include document memory 410, document cluster generation component 420, and document selection component 430.

Document memory 410 may include information relating to documents crawled by server 220, such as documents published by content server(s) 230. The documents may include textual web documents, videos, audio recordings, images, or combinations of these types of documents. In one implementation, document memory 410 may store a keyword index taken of the documents and a link to the content server at which the document is located. Document memory 410 may be generated by server 220 crawling content servers 230 to obtain new documents. Alternatively, or additionally, content server(s) 230 may upload new documents, as they are published, to document memory 410.

In one implementation, in which search engine 225 is a news search and aggregation site, documents in document memory 410 may be limited to documents that are determined to be news articles or documents related to news articles. For example, search engine 225 may maintain a list of content publishers that publish news articles. In this situation, server 220 may only crawl the content publishers in the list to obtain new documents.

Document memory 410 may be accessed by document cluster generation component 420. Document cluster generation component 420 may create clusters of related documents or document sources. The similarity of the documents in a cluster may define a topic for the cluster. For news articles, for instance, a number of news articles, published by a number of different sources, may all be related to a real-world event (e.g., the news event or topic).

Document cluster generation component 420 may determine the documents related to the event based on a number of factors, such as similarity of content (e.g., documents describing the effects of a recent tornado in Kansas may tend to include the terms "tornado" and "kansas") or closeness in the publication date/time. Techniques for determining clusters of related documents are generally known.

In addition to clustering similar document, document cluster generation component 420 may include other documents, such as documents that are not necessarily documents that directly describe the topic (e.g., for news documents, the document may be published well before the news event), but may provide context to or additional information that may be useful to a user when exploring the topic. For example, people, places, and things may be associated with documents that describe the person (e.g., a biography page), place or thing. As another example, weather forecasts or other weather information may be useful in the context of an event. As another example, for a news article that references a public company, a link to financial information (e.g., a stock quote) for the company may be useful to a reader reading the news article about the company.

In some implementations, document cluster generation component 420 may automatically determine clusters of documents, and the topics associated with each cluster, from document memory 410. In another possible implementation, information describing an intended topic (topic descriptive information) may be input to document cluster generation component 420, which may then generate a cluster of documents based on the input topic. Descriptive information for a topic may be input as, for example, a word, a phrase, or as link to a document that is to be used to generate the cluster.

Document selection component 430 may receive the document cluster(s) from document cluster generation component 420. Document selection component 430 may select documents from the cluster to use in a summary view and in an expanded view. In one implementation, document selection component 430 may choose documents such that certain categories or types of documents are used. For example, document selection component 430 may choose one or two documents to use in the summary view. These documents may be selected as highly ranked textual web documents that are determined to be about the topic of the cluster. Other document types, such as videos, if available, may be chosen for the expanded view. Other document types, such as documents that provide context for the topic of the cluster, may be selected. As another example of a different type of document that may be chosen for the expanded view, document chooser component 430 may select images or search queries related to the topic. The different chosen documents may be from a number of different content servers 230 or domains. A separate domain may correspond to a separate hostname that is used to identify a web site.

A number of example document types are illustrated as being output, in FIG. 4, by document selection component 430. The documents include: primary representative documents, which may include highly ranked documents (e.g., documents with ranking/relevancy scores greater than a threshold) that are relevant to the topic and are to be displayed in the summary view; secondary document(s), which may include one or more documents that are relevant to the topic and that are to be listed in the expanded view; videos relating to the topic (e.g., newscasts about a news event); images relating to the topic; context articles; related searches, which may include search queries that were previously performed by other users interested in the topic; and other related information/facts. Other document types may additionally be used.

Although FIG. 4 shows example functional components of server 220, in other implementations, server 220 may contain fewer functional components, different functional components, differently arranged functional components, and/or additional functional components than those depicted in FIG. 4. Alternatively, or additionally, one or more functional components of server 220 may perform one or more other tasks described as being performed by one or more other functional components of server 220.

Figure 5:
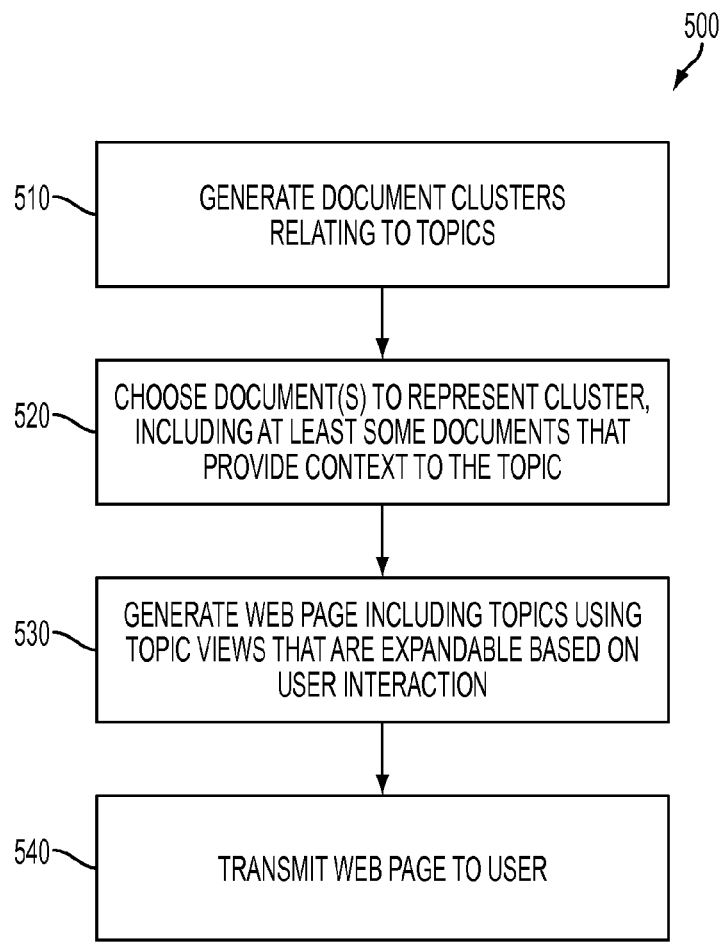
FIG. 5 is a flow chart of an example process for generating summary and expanded views for topics.

FIG. 5 is a flow chart of an example process 500 for generating summary and expanded views for topics. Process 500 may be performed by, for example, server 220 or a group of devices separate from, or including, server 220.

Process 500 may include generating document clusters relating to topics (block 510). In some implementations, document cluster generation component 420 may automatically determine clusters of documents, and the topics associated from each cluster, from document memory 410. For a news search engine, for example, an automatic clustering may be performed on recent documents from predetermined news content providers. If a number of such documents are similar, and tend to form a cluster, a news document cluster may be created. In another possible implementation, a word, a phrase, or a document, such as a document relating to a current news story, may be input to document cluster generation component 420, which may then generate a cluster of documents relating to the word, phrase, or document. Several techniques exist for identifying topics and forming clusters.

Process 500 may further include choosing the documents from a cluster to represent the cluster (block 520). At least some of the chosen documents may include documents that provide context to the cluster (block 520). As previously discussed, document selection component 430 may select documents from the cluster to represent the topic in the summary and expanded views. In some implementations, the documents that provide context to the cluster may be documents that are selected from outside the cluster. For example, a cluster may include news documents relating to a news story about the trial of a celebrity. The documents that provide context may include a document providing a biography of the celebrity. In some implementations, the context documents may include facts or other information that may be directly displayed in summary and/or expanded views. For example, a weather report may be displayed with a weather related news topic and a stock quote may be displayed with a finance related news topic. The documents that provide context to the cluster may be, for example, documents that are obtained through a search using a search engine or a predetermined set of documents.

Process 500 may further include generating a web page that includes the topics (block 530). The web page may include instructions to display each topic (or, in some implementations, at least some) in an expandable visual area such that the user can select between a summary view and an expanded view (block 530). The web page may present, for a topic, the documents chosen in block 520. In one implementation, a visual icon may be displayed when the user mouses over the visual area of a topic. By selecting the icon, the visual area may change from the summary view to the expanded view or from the expanded view to the summary view. In this way, for a list of topics and at the user's discretion, any number of the topics can be concurrently shown in either the expanded or summary view.

In one implementation, the expandable visual area may be implemented using, for example, a scripting language, such as JavaScript included as part of hyper-text markup language (HTML) code that defines the web page. Other scripting languages or other techniques may alternatively be used to switch between summary and expanded views.

Process 500 may further include transmitting the web page to the user at a client 110 (block 540). The user may then view and interact with the web page using, for example, a browser program. In some situations, the web page may be uniquely generated and transmitted to each user. Alternatively, or additionally, the web page may be pre-generated and transmitted to multiple users. For example, the home page for a news search site may include a number of current news topics, that for a particular period, such as an hour or ten minutes, remain static. In this case, all users visiting the home page for the news search site may receive a copy of the same web page.

A number of example user interfaces, illustrating example implementations of the summary and expanded views, will next be discussed with reference to FIGS. 6-9.

Figure 6:
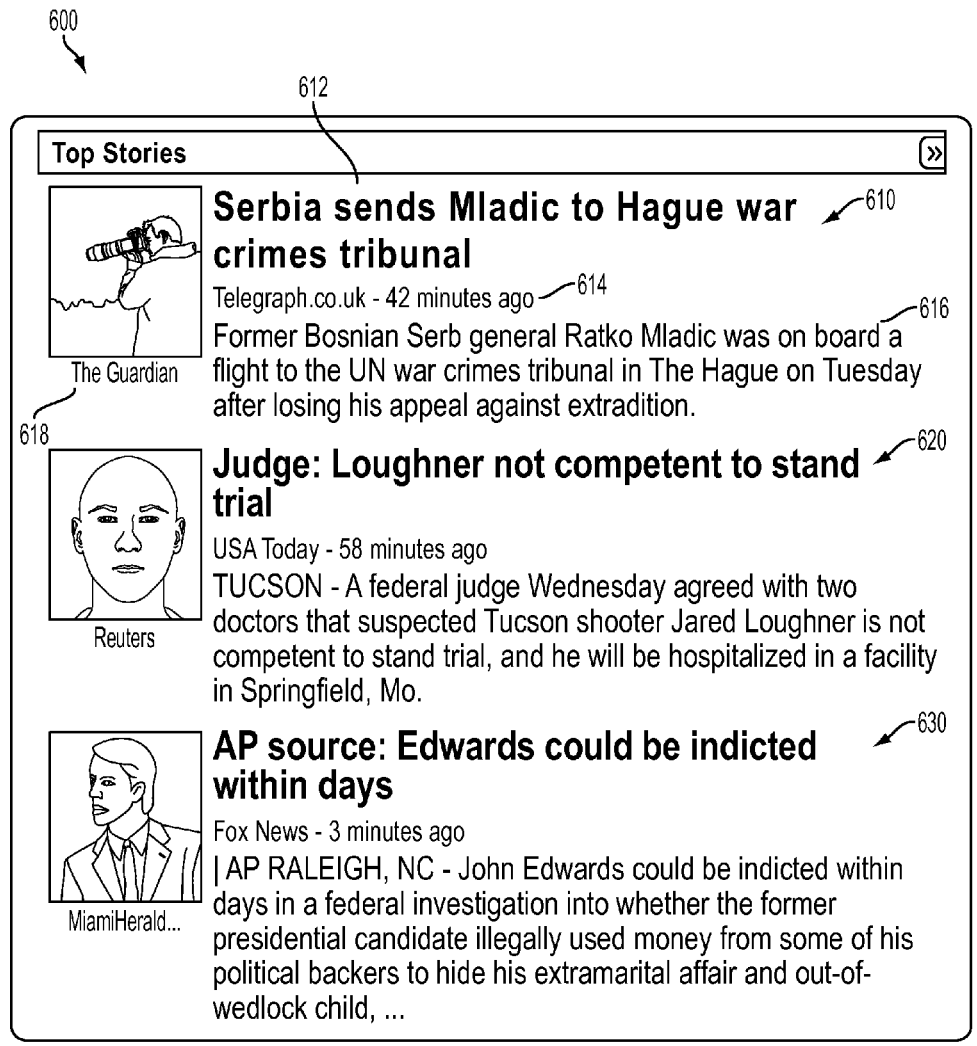
FIGS. 6 to 9 are diagrams of example user interfaces.

FIG. 6 is a diagram of a user interface 600, such as a user interface presented by a browser program executing at one of clients 110. In FIG. 6, a list of three topics 610, 620, and 630 is illustrated, in which each topic is presented to the user as a summary view. Each topic may correspond to a cluster of documents. In the summary view, each topic may include a title for the topic, a snippet of text that may provide additional information relating to the primary document for the topic, and an image.

For topic 610, for instance, title 612 is illustrated as "Serbia sends Mladic to Hague war crimes tribunal." Title 612 may include anchor text for a link that, when selected by a user, may present the linked document (e.g., the primary document for this topic) to the user. Topic 610 may also include information 614 describing the source of the primary document (e.g., Telegraph.co.uk, 42 minutes ago). Topic 610 may also include a snippet of text, snippet 616, which may include text from the primary document. In general, snippet 616 may be selected to provide the user with a brief summary of the primary document. For example, as illustrated, snippet 616 may include the first sentence from the primary document. An image 618 may also be associated with the summary view for topic 610. The image may include, for example, a thumbnail image from the primary document, another document in the cluster, or from another source (e.g., a stock image). Image 618 may also act as a link so that, when selected by the user, it may present the primary document or to another document in the cluster to the user.

Figure 7:

FIG. 7 is a diagram of a user interface 700, such as a user interface presented by a browser program executing at one of clients 110. Interface 700 may be a version of interface 600 in which a user expands topic 610 by, for example, selecting an icon 705. In response, topic 610 may expand to the expanded view in which additional information relating to the topic is shown. In FIG. 7, the additional information is shown as links 712 to additional documents in the cluster; links 714 to related searches; links 716 to additional documents; and links 718 to videos/images about the topic.

Links 712 to additional documents may include links to the secondary documents, such as news articles, about the main topic. Links 712 may link to documents that overlap, in content, with the primary document. In some implementations, the secondary documents may be selected to minimize too much overlap or to minimize duplicate content. Links 714 to related searches may include one or more links, that when selected, may initiate a search (e.g., submit a search query to search engine 225) for the search query of the link. In FIG. 7, the search queries "Ratko Mladic," "Serbia," and "Bosnia and Herzegovina" are shown. Links 716 to additional documents may include links to one or more additional documents. The additional documents may be context documents that provide additional information, about the topic, but that may not be traditional news stories for the topic. As shown in FIG. 7, the links 716 to the documents may include labels such as "International," "Opinion," "In Depth," and "Wikipedia" to apprise the users that these links refer to specific types of documents. Links 718 to videos may include links to videos relevant to the topic. As shown in FIG. 7, each link may be displayed as an image, such as an image from the video.

In one implementation, by selecting icon 705 for a particular topic, the view of the topic may toggle between the summary view and the expanded view. Thus, a user viewing the summary view can select icon 705 to see the expanded view and then select icon 705 again to return to the summary view. Icon 705 may change its visual appearance when switching between the summary and expanded views.

Further, the various links shown for topic 610 may be from different domains, such as from different web sites or content servers. For example, each of links 712 to additional local documents may link to a different news web site. Links 716 may link to yet other domains.

Figure 8:

FIG. 8 is a diagram of a user interface 800, such as a user interface presented by a browser program executing at one of clients 110. Interface 800 may be similar to interface 700, except that another topic, topic 810, is shown in an expanded view. In FIG. 8, information shown for topic 810 includes links 812 to additional documents in the cluster; links 814 to related searches; link 816 to an additional document labeled as a local document ("Local"); a link 818 to an additional document labeled as a wiki document; links 820 to videos; and an image link 822.

Links 812 to additional documents may include links to the secondary documents, such as news articles, about the main topic ("Will Republicans learn the of lesson NY-26 loss?"). Links 814 to related searches may include one or more links that, when selected, may initiate a search for the search query of the link. In FIG. 8, the search queries "Kathy Hochul," "Paul Ryan," and "Jane Corwin" are shown. Link 816 to a local document may include a link that has the label "Local." Similarly, link 818 may include a link to wiki document about "Kathy Hochul" and is labeled "Wikipedia." Additionally, links 820 may include links to videos about the topic and link 822 may be in the form of an image that may link to a document, such as a text document or an image, about the topic.

Expanded interfaces 710 (FIG. 7) and 810 (FIG. 8) generally illustrate some types of links and/or documents that may be included in an expandable view of a topic. Other types of links and/or documents may additionally be included. For example, the labels shown in FIGS. 7 and 8 (e.g., "Local") may include other labels, such as a "Highly Cited" label to indicate that a particular document is frequently linked to by other documents or "Opinion" to indicate that a document is an editorial document. Other examples of possible labels that may be used include: International, Live Blog, Satire, Preferred Source, and "Important." Some labels, such as Important, may be labels that are provided by the publisher of the document. Other labels may be determined and associated with the document by search engine 225. Additionally, other information, such as facts relevant to a topic, may be displayed in an expanded view. For instance, for a topic about a heat wave in a particular region, the daily high temperature for the region may be presented. As another example, for a finance topic about a public company, a stock quote may be presented. Additional examples of information that may be shown in a the expanded view may include infographics (e.g., graphic visual representations of information, data, or knowledge) and user interactive boxes, such as a search box, user poll interfaces (e.g., a user may vote on a subject related to the topic by selecting choices in a user poll graphic), etc.

Figure 9:
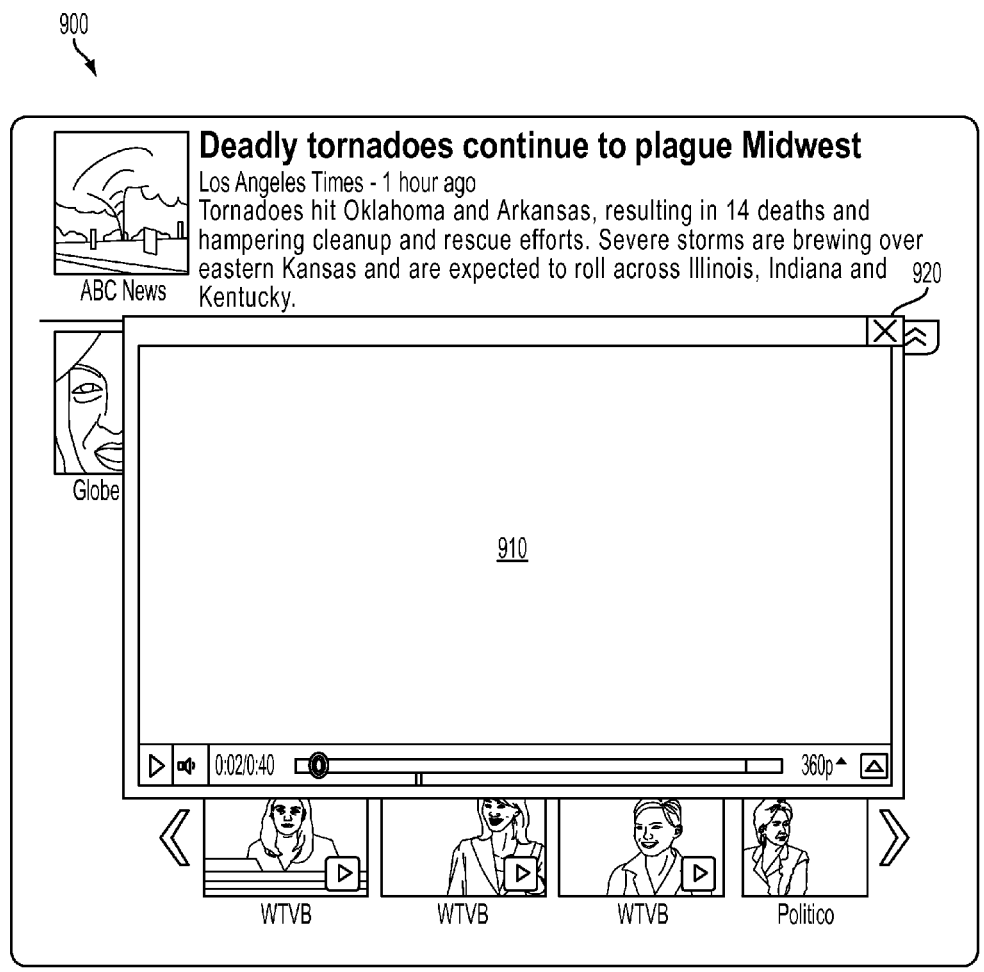

FIG. 9 is a diagram of a user interface 900 that may be presented to a user in response to selection of a video link, such as one of links 820. As illustrated, the video may play back in an active window 910 that is overlaid on the interface of the expanded and summary views (e.g., as illustrated, on interface 800). The overlaid interface may be visually dimmed or otherwise de-emphasized relative to active window 910. By selecting a close icon, such as icon 920, a user may close active window 910 and interface 900 may revert back to the list of summary and expanded views.

As described above, a list of topics may be efficiently presented to a user using summary views and expanded views. For any topic in which the user is particularly interested, the user may change the summary view to the expanded view. Advantageously, the expanded view may present different types of information, and information from a number of different sources (e.g., from a number of different servers or domains) to the user. The expanded view may particularly include context information that may provide background information or other information, that would not necessarily be considered to be on point to the topic, but that a reader interested in the topic, may consider useful.

The foregoing description provides illustration and description, but is not intended to be exhaustive or to limit the implementations to the precise form disclosed. Modifications and variations are possible in light of the above teachings or may be acquired from practice of these implementations.

For example, while a series of blocks has been described with regard to FIG. 5, the order of the blocks may be modified in other implementations. Further, non-dependent blocks may be performed in parallel. In addition, other blocks may be provided, or blocks may be eliminated, from the described flowcharts, and other components may be added to, or removed from, the described systems.

Also, certain portions of the implementations have been described as a "component" that performs one or more functions. The term "component" may include hardware, such as a processor, an ASIC (application-specific integrated circuit), or an FPGA (field programmable gate array), or a combination of hardware and software (e.g., software running on a general purpose processor—creating a specific purpose processor).

It will be apparent that aspects described herein may be implemented in many different forms of software, firmware, and hardware in the implementations illustrated in the figures. The actual software code or specialized control hardware used to implement aspects does not limit the eimplementations. Thus, the operation and behavior of the aspects were described without reference to the specific software code—it being understood that software and control hardware can be designed to implement the aspects based on the description herein.

It should be emphasized that the term "comprises/comprising," when used in this specification, is taken to specify the presence of stated features, integers, steps, or components, but does not preclude the presence or addition of one or more other features, integers, steps, components, or groups thereof.

Even though particular combinations of features are recited in the claims and/or disclosed in the specification, these combinations are not intended to limit the disclosure of the implementations. In fact, many of these features may be combined in ways not specifically recited in the claims and/or disclosed in the specification. Although each dependent claim listed below may directly depend on only one other claim, the disclosure of the implementation includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, performed by one or more server devices, the method comprising:
   determining a plurality of clusters for a plurality of documents, where a particular cluster, of the plurality of clusters, includes particular documents, of the plurality of documents, that are related to a particular topic from a list of topics, the particular topic being a news event;
   selecting a first document of the particular documents, to use in a summary view for the particular topic based on a ranking of the document;
   selecting two or more second documents, of the particular documents, to use in an expanded view for the particular topic;
   providing, by at least one of the one or more server devices, information regarding the particular topic based on selecting the first document for the summary view and the second documents for the expanded view, where the information regarding the particular topic includes instructions to selectively display the information regarding the particular topic as one of two views,
   the two views comprising:
      a first view in which a link to the first document is presented to a user, the first view being the summary view, and
      a second view, expanded visually relative to the first view, in which a plurality of links to the second documents are presented to the user, the second view being the expanded view, each of the plurality of links associated with an individual domain,
      the plurality of links including two or more links that are presented as images from the two or more second documents, and the two or more second documents corresponding to the two or more links, one of the plurality of links when selected by the user causes a video to play in an active window that is overlaid on the second view, the second view being visually dimmed relative to the active window while the active window is overlaid on the second view, and
      where the document relating to the particular topic and the other documents are selected from the particular cluster, the second view includes a label that identifies a different type of document;
   providing, by the at least one of the one or more server devices, at least one visual element in the information regarding the particular topic that, when selected by the user for the particular topic, determines the view corresponding to the particular topic, wherein when the determined view is the first view, the view corresponding to the particular topic is changed to the second view and when the determined view is the second view, the view corresponding to the particular topic is changed to the first view; and
   transmitting, by the at least one of the one or more server devices, the information regarding the particular topic to a client device associated with the user.

2. The method of claim 1, where the at least one visual element includes a visual icon that is presented in response to a mouse over event by the user.

3. The method of claim 1, where the plurality of links further include links that are visually presented as anchor text and links that are visually presented as images that are visually distinguished as initiating video.

4. The method of claim 1, where the label includes one or more of:
   a label that identifies the other document as highly cited,
   a label that identifies the other document as a local document,
   a label that identifies the other document as being an opinion document, or a label that identifies the other document as being from an online encyclopedia or wiki.

5. The method of claim 1, where the at least one of the one or more server devices implements a news search engine.

6. The method of claim 1, further comprising:
   selecting at least one additional link to provide context to the particular topic,
   the at least one additional link being provided in the second view and the at least one additional link corresponding to a different document that is outside of the particular cluster.

7. A non-transitory computer readable medium containing instructions executable by at least one processor, the instructions comprising one or more instructions that, when executed by the at least one processor, cause the at least one processor to:
   determine a plurality of clusters for a plurality of documents, where a particular cluster, of the plurality of clusters, includes particular documents, of the plurality of documents, that are related to a particular topic from a list of topics;
   select a first document; of the particular documents, to use in a summary view for the particular topic based on a ranking of the document;
   select two or more second documents, of the particular documents, to use in an expanded view for the particular topic;
   provide, based on selecting the document for the summary view and the second documents for the expanded view, information regarding the particular topic presented in a visual area that is provided to a user as one of two views,
   the two views comprising:
      a first view in which a link to the document is presented to a user, the first view being the summary view, and
      a second view, expanded visually relative to the first view, in which a plurality of links to the second documents are presented to the user, the second view being the expanded view, each of the plurality of links associated with an individual domain, the plurality of links including two or more links that are presented as images from the two or more second documents, and the two or more second documents corresponding to the two or more links, one of the plurality of links when selected by the user causes a video to play in an active window that is overlaid on the second view, the second view being visually dimmed relative to the active window while the active window is overlaid on the second view, and the visual area responding to input from the user by changing from the first view to the second view or from the second view to the first view, the second view includes a label that identifies a different type of document;

provide at least one visual element in the information regarding the particular topic that, when selected by the user for the particular topic, determines the view corresponding to the particular topic, wherein when the determined view is the first view, the view corresponding to the particular topic is changed to the second view and when the determined view is the second view, the view corresponding to the particular topic is changed to the first view; and transmit the information regarding the particular topic to the user.

8. The non-transitory computer-readable medium of claim 7, where the instructions further comprise:

one or more instructions that, when executed by the at least one processor, cause the at least one processor to: select the particular documents from the particular cluster based on types of the particular documents.

9. The non-transitory computer-readable medium of claim 7, where the plurality of links includes links that are visually presented as anchor text and links that are visually presented as images that are visually distinguished as initiating video.

10. The non-transitory computer-readable medium of claim 7, where the labels include one or more of:

a label that identifies another document, of the two or more different documents, as highly cited relative to one or more of the other documents, a label that identifies the other document as a local document, a label that identifies the other document as being an opinion document, or a label that identifies the other document as being from an online encyclopedia or wiki.

11. The non-transitory computer-readable medium of claim 9, where the computer-readable medium further includes instructions to:

determine two or more different links of the plurality of links, to two or more different documents of the other documents, to provide context to the particular topic corresponding to the second view.

12. A method, performed by one or more server devices, the method comprising:

receiving, by at least one of the one or more server devices, information describing a topic;

determining, by at least one of the one or more server devices and based on the information, a cluster of documents relating to the topic;

selecting a first document from the cluster of documents, to use in a summary view for the topic based on a ranking of the document within the cluster of documents;

selecting, by at least one of the one or more sewer devices and from the cluster of documents relating to the topic; two or more documents to use in an expanded view;

generating, by at least one of the one or more server devices, instructions to present the topic to a user as one of two views, the instructions comprising:

first instructions to present a first view, of the two views, as a link to the document, second instructions to present a second view, expanded visually relative to the first view, in which a plurality of links to the second documents are presented to the user, the second view being the expanded view, the plurality of links including two or more links that are presented as images from the two or more second documents, and each of the plurality of links associated with an individual domain, one of the plurality of links when selected by the user causes a video to play in an active window that is overlaid on the second view, the second view being visually dimmed relative to the active window while the active window is overlaid on the second view, the second view includes a label that identifies a different type of document, and third instructions to provide a selectable visual element in the first view and the second view, the selectable visual element, when selected by the user, determines the view corresponding to the particular topic, wherein when the determined view is the first view, the view corresponding to the particular topic is changed to the second view and when the determined view is the second view, the view corresponding to the particular topic is changed to the first view; and transmitting, by at least one of the one or more server devices, the instructions to a device of the user.

13. The method of claim 12, where the instructions further include fourth instructions to present two views for each of a plurality of other topics to the user.

14. The method of claim 12, where the information, describing the topic, includes another document or a search query.

15. The method of claim 12, where the plurality of links include links that are visually presented as anchor text and links that are visually presented as images that are visually distinguished as initiating video.

16. The method of claim 12, where the labels include one or more of:

a label that identifies another document, of the two or more different documents, as highly cited relative to one or more of the other documents, a label that identifies the other document as a local document, a label that identifies the other document as being an opinion document, or a label that identifies the other document as being from an online encyclopedia or wiki.

17. The method of claim 12, further comprising:

determining two or more different links of the plurality of links, to two or more different documents of the other documents, to provide context to the topic.

* * * * *